United States Patent [19]

Wallace

[11] 4,321,885
[45] Mar. 30, 1982

[54] RING PATCH FOR NUTS

[75] Inventor: Richard B. Wallace, Bloomfield Hills, Mich.

[73] Assignee: The Oakland Corporation, Troy, Mich.

[21] Appl. No.: 256,720

[22] Filed: Apr. 23, 1981

Related U.S. Application Data

[63] Continuation-in-part of Ser. No. 116,016, Jan. 28, 1980, Pat. No. 4,279,943.

[51] Int. Cl.³ .............................................. B05D 7/22
[52] U.S. Cl. ..................................... 118/102; 118/105; 118/106; 118/109; 118/110; 118/408; 118/410; 118/421
[58] Field of Search ................ 427/57, 238, 239, 273, 427/336, 355, 277, 375; 118/408, 421, 693, 102, 105, 106, 109, 110, 410; 264/267, 268, 269

[56] References Cited

U.S. PATENT DOCUMENTS

| | | | |
|---|---|---|---|
| 1,621,016 | 3/1927 | Jackson | 118/408 |
| 2,349,444 | 5/1944 | McGowan | 118/408 |
| 2,455,129 | 11/1948 | Lepperhoff | 118/408 |
| 2,821,491 | 1/1958 | Fleming | 427/336 |
| 3,224,411 | 12/1965 | Blaha et al. | 118/408 |
| 3,294,139 | 12/1966 | Preziosi | 118/408 |
| 3,830,902 | 8/1974 | Barnes | 118/408 |
| 3,995,074 | 11/1976 | Duffy et al. | 427/239 |
| 4,020,198 | 4/1977 | Cornelius et al. | 427/336 |

Primary Examiner—Ralph S. Kendall
Attorney, Agent, or Firm—Whittemore, Hulbert & Belknap

[57] ABSTRACT

Apparatus for the quantity production of friction nuts prepared for subsequent fusion of thermoplastic resin particles deposited in thread grooves therein, in which the nuts are supported with their axes vertical, a fluid slurry of the particles in a liquid carrier is introduced into the threaded interior of the nuts to fill the threaded opening, including the thread grooves therein, either completely or to a predetermined level from the bottom of the nuts. Excess slurry is then drained from the bottom ends of the openings. The exterior of the nuts is washed or otherwise cleared of any slurry thereon. In order to leave the threads clear of obstruction at the bottom of the nut, the deposited slurry, after partially drying, is removed from the bottom thread convolutions by repeatedly inserting and withdrawing a sponge-like material directly into and out of the lower end of the thread opening, or by strongly agitating a small quantity of water in the lower part of the threaded opening, or otherwise.

28 Claims, 14 Drawing Figures

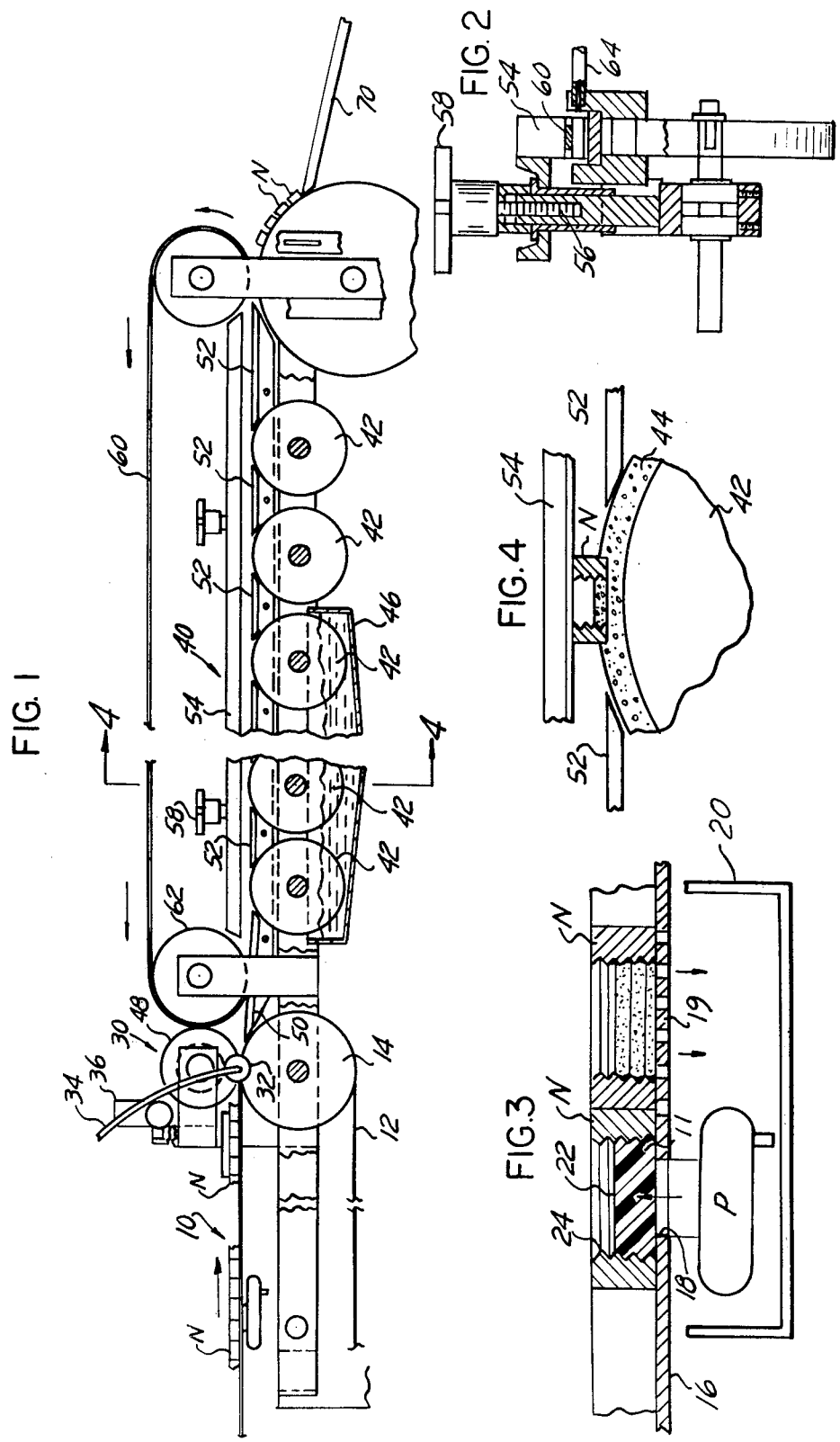

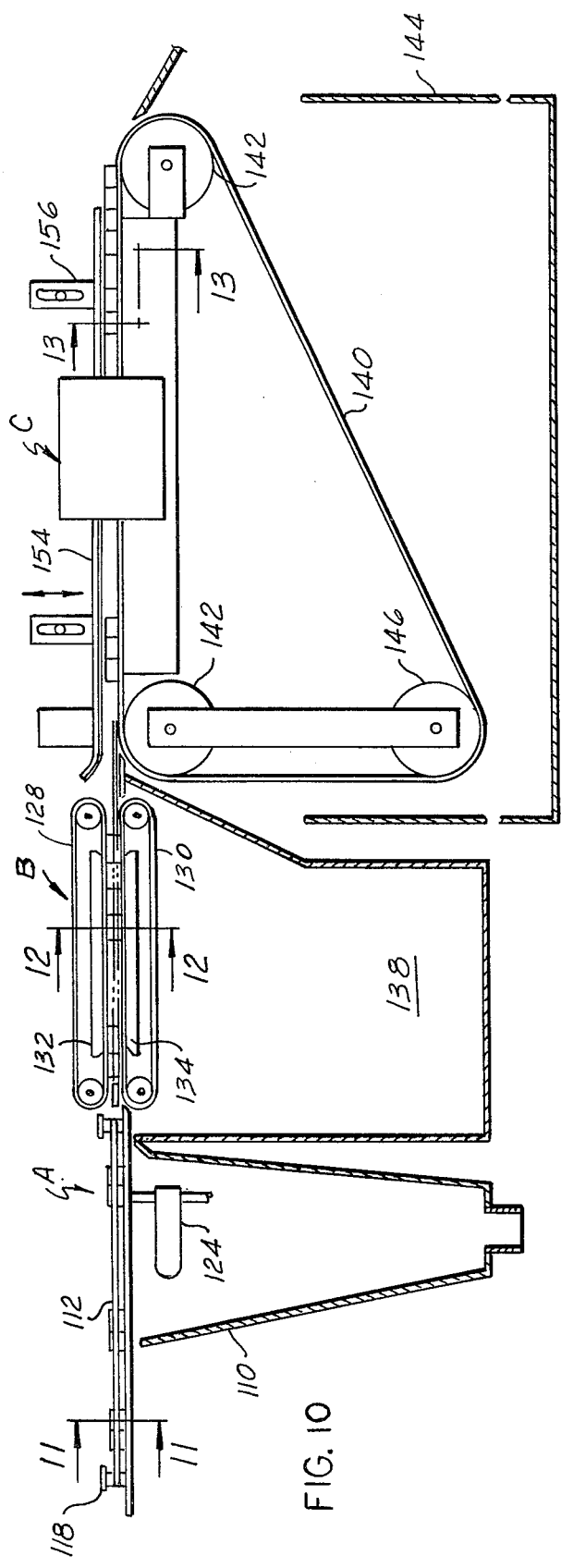
FIG. 10
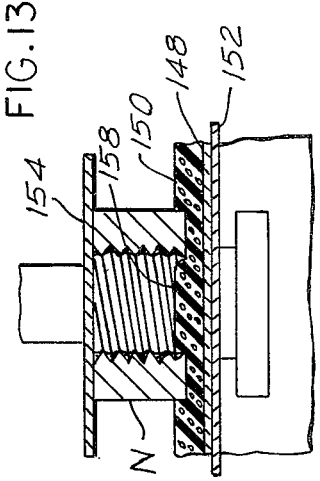
FIG. 13
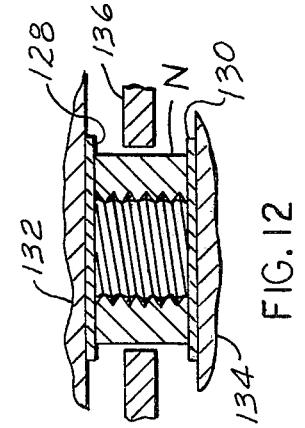
FIG. 12
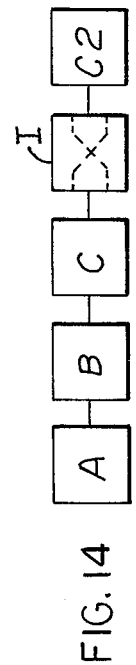
FIG. 14
FIG. 11 ns,885

RING PATCH FOR NUTS

CROSS REFERENCE TO RELATED APPLICATION

The present invention is a continuation-in-part of my co-pending application Ser. No. 116,016, filed Jan. 28, 1980 now U.S. Pat. No. 4,279,943.

BACKGROUND AND SUMMARY OF THE INVENTION

The problem of providing an annular or ring patch of fused thermoplastic material bonded to the thread groove surfaces at the interior of a nut has long posed difficulties.

The end desired result is a nut having a solid complete 360° ring of thermoplastic material, such as nylon 11, bonded in the thread grooves to the thread surfaces in such a way as to leave the end convolutions free of deposit to facilitate threading onto a mating article.

In the past, two different solutions to the problem have been proposed. In one the nut is first heated and then dry powdered resin is blown onto the hot threads. This method is disclosed in Duffy U.S. Pat. No. 3,896,760. In the other, dry powdered resin is deposited in the threads, and suitably confined as by a pin, and the entire assembly, including the pin, is subsequently heated while maintaining the pin and nut in a predetermined spacial orientation. Such an operation is disclosed in Newnon U.S. Pat. No. 3,975,897, for example.

Both of these operations, which require the application of dry resin powder to a hot nut, or retaining the powder on the nut while it is heated, require complicated and expensive equipment and are inherently difficult to carry out.

In my prior copending application, Ser. No. 892,505, these objections are overcome and the resin is provided in an efficient manner to the thread surfaces where it may subsequently be fused while the nuts are randomly positioned in bulk. In this prior application, the powdered resin is provided in a fluid slurry which is applied to the threads at the interior of a nut by slinging the slurry radially outwardly from a zone located within the threaded nut opening. In order to obtain quantity production it is necessary to provide for insertion and withdrawal of slinging mechanism relative to the nut opening which in turn requires advancing a series of nuts intermittently.

In accordance with the present invention, a series of nuts are advanced continuously with their thread axes vertical, and the threaded openings are filled with fluid slurry either completely or to a predetermined height, leaving the top few thread convolutions clear of slurry. Thereafter the slurry is permitted to drain downwardly, leaving in the thread grooves up to the level to which the threaded openings were filled a deposit of slurry which assumes an outwardly concave meniscus surface, the precise contour of which is determined in part by the fluidity or viscosity of the slurry. The excess slurry is captured in a drain receptacle for re-use. The nuts are further advanced during which the excess slurry is washed from the exterior of the nuts, and the slurry in the thread grooves will partially dry.

Finally, the slurry is removed from the bottom few thread convolutions, thus leaving an intermediate ring or band of slurry extending around an annular zone within the threaded interior of the nut spaced from both ends thereof.

The liquid carrier of the slurry deposit is substantially eliminated, and the nuts as so far treated contain essentially solid coherent annular deposits of resin particles within the thread grooves of the nuts, in which the deposits are shaped to present outer concave meniscus surfaces, and in which the deposits are essentially formed of particles of thermoplastic resin, such as nylon 11. These nuts are ready for subsequent heating to fuse the resin particles into essentially solid resin deposits fused to the thread surfaces, in which the shape of the initial slurry deposit in the thread grooves is preserved. This is found to be true, even if the pretreated nuts are heated in bulk in which the individual nuts occupy random positions.

BRIEF DESCRIPTION OF THE DRAWINGS

FIG. 1 is a diagrammatic side elevation of the apparatus for carrying out the present invention.

FIG. 2 is an enlarged sectional view on the line 2—2, FIG. 1.

FIG. 3 is an enlarged diagrammatic view showing the step of filling the threaded openings with slurry to a predetermined height.

FIG. 4 is a diagrammatic view showing removal of slurry from the lower portion of the threaded openings.

FIG. 10 is a side elevation of improved apparatus for the described operation.

FIGS. 11-13 are enlarged sectional views on lines 11—11, 12—12 and 13—13, FIG. 10.

FIG. 14 is a diagrammatic representation of the apparatus of FIG. 10, with the addition on an inverter and second thread clearing station.

DETAILED DESCRIPTION

Figure 5:
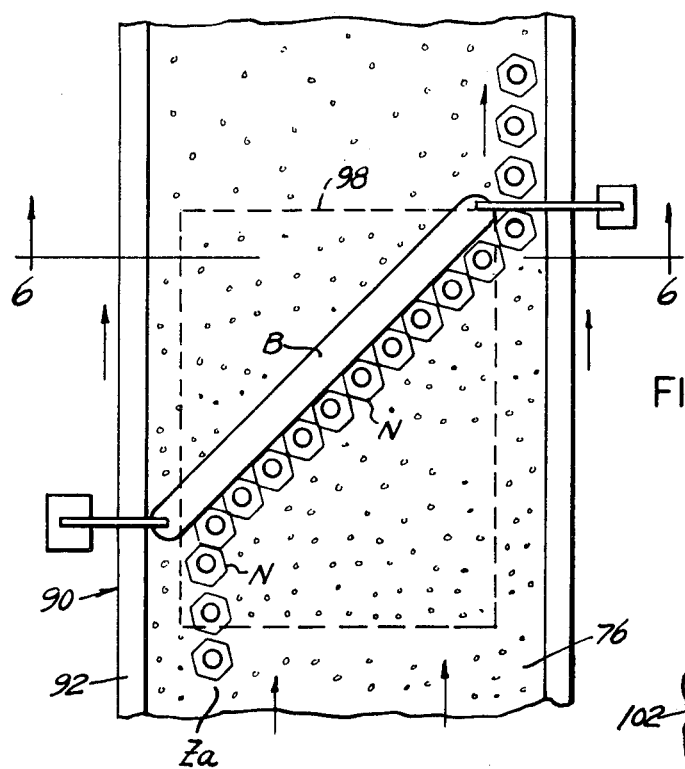
FIG. 5 is a fragmentary plan view illustrating an alternate operation for removal of slurry from the lower portion of the threaded openings.

A series of nuts N are advanced from left to right past a filling station indicated generally at 10 in FIG. 1, details of which are shown in FIG. 3. The nuts are advanced through the filling station 10 by any suitable means. For example they may be advanced in a solid array with flat surfaces in contact simply by the impetus imparted to them by a conventional vibratory feeder. Additional feeding force may be applied by belts 12, advanced by rollers 14, the belts engaging lateral edge portions of the nuts, and feeding them forwardly over a flat horizontal support 16 having an opening 18 over which the nuts N advance. Alternatively, the nuts may be supported and advanced by a belt such as 12 having a multiplicity of openings for communication with a pump P.

Excess slurry is drained away through openings 19, leaving a deposit of slurry only within the thread grooves at the lower ends of the nuts, as seen in FIG. 3.

A slurry receptacle 20 is provided beneath support 16, and is preferably provided with agitating means to keep the solid particles of the slurry in suspension.

The pump P is provided which delivers the fluid slurry upwardly through opening 18 to fill the interior of nuts N to a predetermined level as indicated at 22, leaving the top few thread convolutions clear as indicated at 24. This may be accomplished by controlling the volumetric flow of the pump in relation to the rate of advance of the nuts, so that as each nut traverses the filling station, it is filled to a predetermined level with the fluid slurry.

At 30 in FIG. 1 there is diagrammatically indicated a cleaning station where any slurry on the exterior at the nuts N is removed by suitable means such as an air jet supplied from a nozzle 32 connected to an air pressure line 34, and exhausted through a vacuum horn 36. Alternatively the exterior nut surfaces may be cleaned by spraying and/or brushing.

The nuts N, with the slurry at least partially dried to prevent further downward flow along the thread grooves of the nuts, now proceed to the thread clearing station 40, where the slurry is removed or cleared from the bottom thread convolutions.

At this station there is provided a plurality of clearing rolls 42, each of which is provided with an outer layer or "tire" formed of a soft sponge-like material, for example an urethane sponge, as seen at 44 in FIG. 4. A plurality of these rolls, as for example six, are associated with a tank 46 containing a quantity of the liquid constituting the carrier of the slurry, which may be water. The lower portion of rolls 42 are submerged in this liquid, which washed away the slurry removed from the thread grooves of the nuts, and moistens the sponge-like material to improve its action in clearing the slurry deposit from the lower ends of the thread openings. This recovers substantially all of the resin particles removed form the nuts at station 40.

The nuts are engaged between an upper roller 48 and the lower roller 14 and are thus positively pushed forward in a solid array over rolls 42. Between roll 14 and the initial clearing roll 42 there is bridging element 50, and intermediate the further rolls 42 are similar bridging elements 52.

An adjustable pressure bar 54 is provided in position above rolls 42, and is adjustably supported by screws 56 connected to hand wheels 58. Slidable against the lower surface of bar 54 is a feed belt 60, which is preferably a rubber faced steel belt with its rubber surface engaging the top surface of nuts N and advancing them over rolls 42 and across bridging elements 52. Belt 60 is on rollers 62, one of which is power driven.

Referring now to FIG. 4, it will be seen that as each nut traverses a roll 42, the sponge material 44 is compressed except at the threaded opening at the lower end of the nut. At this point the uncompressed sponge moves substantially directly into and then out of the threaded opening. Since the first several rolls 42 are partly submerged in the liquid in tank 46, the sponge-like material is at least moist, and preferably substantially saturated and performs an efficient wiping action which removes the slurry to the height to which the sponge material extends into the opening, as seen in FIG. 4. If desired the last few rolls (here seen as two) may not be partly submerged in the liquid and will perform a wiping, drying function, since by this time preceding rolls 42 have substantially completely removed the slurry.

It is important that the sponge material be limited to only substantially direct insertion and removal relative to the threaded openings, since the thread crests, and intersections with the lower end of the nut are sharp, and any relative movement between the nuts and the contacting sponge-like material in the direction of advance, or any other horizontal direction, would quickly destroy the sponge-like material. For this reason, each of the rolls 42 is mounted for free rotation, preferably on ball or roller bearings, and are individually rotated solely by the advance of the nuts in contact therewith.

If desired additional air jets may be provided along the path of advance of the nuts as indicated at 64, (FIG. 2) and suitable provision made for collecting any resin particles removed thereby.

It is desired to emphasize that the present invention provided for large quantity, fully automatic production. For this purpose, the nuts advance continuously through the apparatus.

The treated nuts pass over a stripper ramp 70 and may be received in random orientation in a basket or container for subsequent insertion into an oven for fusing the resin particles into an essentially solid state, and fusing the resin to the thread surfaces to provide an effective bonding thereto.

A resin which has proved to be entirely satisfactory in this procedure is nylon 11. The particle size of the powder may vary with the size of the thread, but powder of electrostatic fineness is preferred, since this has less tendency to settle out of a slurry. Electrostatic fineness refers to a powder such as used in deposition in an electrostatic field.

If desired, the bond between the fused resin and the thread surface may be enhanced by inclusion in the resin a small percentage of a resin such as epoxy resin.

While a slurry composed of only the thermoplastic resin powder, such as nylon 11, and the liquid carrier, such as water, forms a sufficiently cohesive deposit of the powder when substantially dried, it will be understood that a very small amount of a binder may be employed. For example about 1% by volume of ethylene oxide has proved to be satisfactory. However, in the nuts the dried slurry deposit is well protected by its position within the central portion of the threaded opening, and no binder is ordinarily required.

It is stressed that the entire operation disclosed herein, in preparing the nuts for subsequent heating, is or may be carried out at ambient or room temperature. On the other hand, initial or partial drying of the slurry deposit may be accelerated by warming the nuts, or by directing drying air over and/or through the nuts subsequent to draining excess slurry from them. In any case, they are not heated to anything approaching the fusion temperature of the resin particles.

Referring now to FIGS. 5-8, there is illustrated an alternative procedure for removing the slurry from the deposit in the thread grooves at the lower end of the nuts as they advance.

It will be recalled that in the method as previously described, the nuts, after having a deposit of fluid slurry provided in the thread grooves in the threaded opening to a level somewhat below the tops of the nuts as they advance as on a belt or guide means with their axes vertical, were subjected to substantially direct, axial, repeated insertion of wet sponge. It has now been found that surprisingly, insertion of sponge or other solid material is not necessary.

Figure 7:
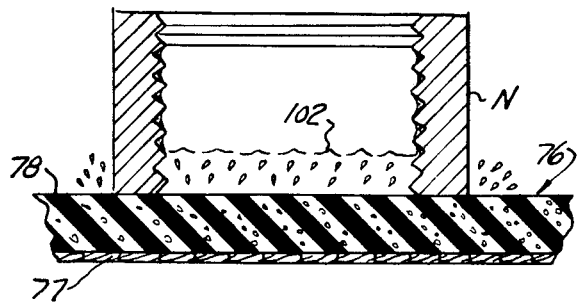
FIG. 7 is an enlarged section through a nut with a suggested illustration of the mode of operation.
Figure 8:
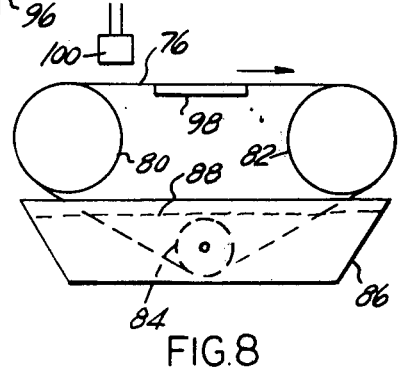
FIG. 8 is a diagrammatic showing of the belt and bath.

Nuts N, pretreated as described in the method illustrated in FIG. 4, up to entry onto ramp 50, are supplied to an advancing belt 76 which as best seen in FIG. 7 has a fabric backing 77, which may be canvas, and a layer 78 of soft absorbent sponge material, such for example as urethane. This belt is advanced over rollers 80, 82, one of which will be power driven, and a guide roller 84 which is rotatable in a tank 86 containing water to a level as indicated at 88. The belt is thus advanced through the tank, and the resin of the resin deposit removed from the thread grooves is recovered for reuse, as for example by return to tank 20, FIGS. 1 and 3.

In its upper horizontal run between rolls 80, 82, the belt is guided on a horizontal support 90, which as shown has edge flanges 92 between which there is a flat horizontal support web 94. Intermediate the rolls 80, 82 there is provided a vibrator 96 which as illustrated includes a plate 98 in contact with the underside of the web 94 in the area indicated in dotted lines in FIG. 5. Alternatively, plate 98 may directly contact the lower fabric surface of belt 76, as through an opening (not shown) in web 94.

In order to utilize belt 76 most efficiently, nuts N are deposited at one edge of the belt, as at zone Za. An inclined transfer bar B is provided in the vibratory zone 98, so that as the nuts advance with the belt 76, they are shifted to the opposite edge of the belt as shown. This insures that substantially the entire width of the belt, which is several times greater than the transverse dimension of the individual nuts, is utilized, and as each nut shifts transversely of the belt as it traverses the vibratory zone, it moves across fresh, fully saturated sponge portions.

Excellent results have been obtained using a vibrator of the type used in vibratory feeding, having a frequency of 40–100 cps, preferably about 60 cps, and an amplitude of 0.001–0.005 inches, which may be about the same as used in vibratory feeding in equipment sold under the trademark Syntron.

Since the sponge belt emerges from the water bath just before it passes around roll 80, the sponge will be substantially saturated. However, if too much water is removed by passing around roll 80, additional water may be added by a spray head 100.

It will be noted that flanges 92 extend above the sponge belt 76 and prevent water flowing laterally off the edges of the belt. The continuous advance of the belt carries water in and on the upper surface of the belt along to where it eventually is returned to tank 86.

The height to which the resin deposit is removed from thread grooves, illustrated at 102 in FIG. 7 depends at least substantially on the amount of water carried in and on sponge belt 76. If extra water is added by spray 100, including some in the threaded interior of the nuts, resin will be removed to a higher level, leaving more thread convolutions clear of resin deposit to facilitate threading onto a mating member.

The illustration of FIG. 7 is not intended to indicate a static water level with the nut N at 102, but instead to indicate a zone in which water particles are strongly agitated into contact with the lower thread portions and so to wash or rinse away the resin deposit thereat.

It is to be particularly noted that the nuts N are retained on the belt 76 only by gravity, and the vibration to which the belt is subjected does not cause displacement of the nuts on or away from the belt. The vibration of the at least substantially saturated sponge surface of the belt apparently produces agitation of particles or droplets of the liquid carrier (water) which impinge the interior thread surfaces to a height controlled by the frequency and amplitude of vibration, and by the quantity of liquid carrier trapped within the nuts. The at least partially dried slurry above the annular zone from which the carrier removes the deposit is unaffected.

Referring now particularly to FIGS. 10-14, there is illustrated further improved apparatus for the preparation of nuts for subsequent fusing of resin deposits in the thread grooves thereof.

As seen in FIG. 10, this apparatus is assembled into a production line comprising a plurality of stations. At station A the interiors of advancing nuts are first partly or completely filled with slurry and the excess slurry drained back into a tank, leaving only a deposit in the bottoms of the thread grooves, in substantially the form shown at 102 in FIG. 9. At station B, any slurry on the nut exteriors is washed away, while the deposit in the thread grooves is protected. At station C, the deposit in the thread groove adjacent the lower ends of the nuts is eliminated.

Referring first to FIG. 10 in conjunction with the enlarged sectional view of FIG. 11, the nuts N are advanced over a tank 110 containing the fluid slurry by belts 112 preferably in the form of flexible tubes as best seen in FIG. 11. Belts 112 are movable in grooves 114 in guide bars 116 by rollers 118.

In FIG. 10 the belts 112 are shown as terminating at the downstream end of station A, but if desired may continue through stations B and C, or similar feed belts may be provided at stations B and C.

As the nuts traverse station A they are supported on guide flanges 120 which leave the threaded interiors of the nuts unobstructed. The nuts are advanced past the feed pipe 122, the upper open end of which lies just below the lower ends of the nuts. Slurry is delivered from a pump 124 into the threaded holes of the nuts.

In the embodiment of the invention first described, it was said that the slurry was preferably fed into the nuts to fill them to a level below the top. While this is possible, it required precision control, and it is now contemplated that an excess of slurry is delivered, so as to overfill the holes, as suggested at 126 in FIG. 11. In fact, slurry may even flow down the outsides of the nuts.

Under these circumstances it is of course necessary to clear the slurry from the exterior of the nuts. This is accomplished at station B, where the nuts are advanced between an upper endless belt 128 and a lower endless belt 130. Belts 128 and 130 close the ends of the nuts and prevent the washing process from disturbing the deposit 104 within the thread grooves. The horizontal runs of the belts are slidable on guide bars 132, 134. The belts 128, 130 may be driven and may serve to advance the nuts N. Alternatively the nuts may be driven by belts such as belts 112, in which case belts 128 and 130 may be replaced with stationary smooth closure strips.

In any case nozzles direct jets of cleaning liquid (water) against the sides of the nuts, and the belts 128, 130 or the strips substituted therefor effectively clean the ends of the nuts.

It will be noted that the liquid from nozzles 136 drains into tank 138, so that the resin washed from the exterior of the nuts may be recovered for mixing into the slurry in tank 110.

At station C the slurry will have dried sufficiently so that it will not flow downwardly along the thread grooves, and the partially dried slurry is eliminated from the bottom one or two convolutions of the thread grooves to facilitate threading the nut onto a bolt. The mechanism for accomplishing this is seen in FIGS. 10 and 13.

An endless belt 140 is driven by rollers 142 and is led through liquid in a tank 144 by a guide roller 146. Belt 140 includes a flexible backing 148 and a ply of soft porous sponge 150. The ply of sponge is at the upper side of the horizontal run of the belt and receives the nuts N as best seen in FIG. 13. Since the belt is led through the tank 144 to be immersed in cleaning liquid therein, it is substantially saturated as nuts are received thereon from station B.

Figure 6:
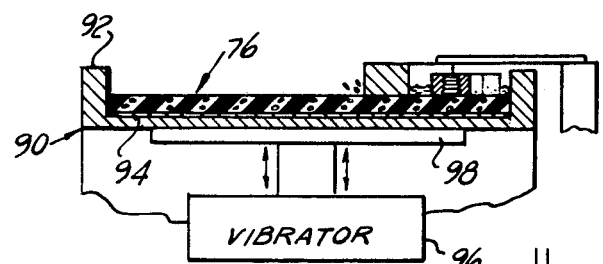
FIG. 6 is a sectional view on line 6—6, FIG. 5.

Intermediate rollers 142 the belt advances over a smooth support plate 152 to which is connected a vibrator of the type disclosed at 96 in FIG. 6. Above the belt is a pressure plate 154 which is vertically adjustable by supports 156.

The nuts N are advanced through station C by the belt 140. As the nuts are received from station B, they are forced into the soft sponge material of the belt by an amount determined by the adjustment of pressure plate 154. This causes material of the sponge to be displaced into the interior of the nuts by a controllable amount, as seen at 158.

As before, the frequency and amplitude of vibration imparted to the belt is adjustable. So too is the quantity of water in the sponge, of which an excess may be supplied by means such as nozzle 100 seen in FIG. 8. Finally, the displacement of the sponge material into the nut interior is controlled by adjustment of pressure plate 154. The cleaning action at station C may be fine-tuned by adjustment of these conditions, so as to control the depth or height from which slurry deposit is removed from the thread grooves.

It will be recognized that as thus described, a nut that was completely filled or overfilled at station A will have a slurry deposit extending to the upper end of the threaded hole. While in some cases this is acceptable, this slurry may be removed from one or two convolutions if desired to leave only a central circumferential band of friction material spaced from both ends of the nut. As suggested in diagrammatic FIG. 14, nuts discharged from the thread clearing device at station C may pass through an inverter I of conventional design to a second thread clearing station here designated as C2.

Accordingly, the nuts are prepared for subsequent heating to fuse the intermediate band of resin particles, leaving one and preferably both ends of the threaded portion clear to facilitate threading with mating members.

Figure 9:
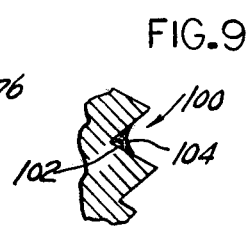
FIG. 9 is a fragmentary sectional view showing the shape of the deposit in a thread groove.

In the preliminary treatment of the nuts, the slurry as it is applied as best seen in FIG. 3 or 11 is quite fluid, and the excess slurry drains freely through openings 19, or from the open lower ends of the nuts, which may be supported only on edge support flanges for this purpose. However, as a result of gravity, surface tension, and apparently as affected by capillary action and the viscosity of the slurry, some of the fluid slurry remains in the thread grooves and flows down the thread groove to form deposits as seen in FIG. 9, where it will be seen the bottom of the thread groove 100 is filled as indicated at 102, while the outer surface 104 of the deposit is concave and becomes tangent to the thread surface at or near the crests of the thread. The deposit of slurry, having assumed the shape seen in FIG. 9, retains this shape even while as fluid as when deposited. However, the slurry quickly loses moisture and becomes at least partially dried. The subsequent removal of the at least partially dried slurry is effectively carried out whether the deposit remains fluid, or is even fully dried, since it is a treatment involving application of the liquid carrier, either in the sponge portion inserted in the threaded opening or in the form of agitated particles or droplets of liquid carrier resulting from the vibratory action.

It will be appreciated that a substantial energy saving results from eliminating the necessity of fusing the resin powder as the nuts advance, and simply collecting a quantity of treated nuts in random disposition for placement in a conventional oven for simultaneous fusion of the dried deposits of slurry, essentially the resin powder component.

An important feature of the present invention is that it permits large volume rapid production of friction nuts in an economic feature which is particularly characterized in saving the energy required to raise the temperature so as to fuse the resin particles.

As illustrated, the nuts advance without manual handling from initial deposit on the horizontal support 16 until they exit the slurry applying mechanism as by the stripper slide 70, which is illustrated in the apparatus in FIG. 1 and which of course may be applied to remove finished nuts as the belt 76 passes around roller 82.

In addition, while as illustrated the nuts are advanced in a single column, it will be appreciated that if desired a solid array of nuts having a width equal to a plurality of nuts may be advanced continuously so that the quantity production may be extremely large. One reason for the efficiency of the procedure is that the nuts are continuously advanced as they are treated as disclosed herein, and may be collected in bulk for subsequent heat treatment in which the deposit of thermoplastic resin particles is fused, as for example in ovens capable of heat treating a large quantity of nuts simultaneously.

I claim:

1. Apparatus for supplying a multiplicity of threaded nuts with solid coherent deposits of thermoplastic particles in thread grooves at intermediate annular zones which comprises
   horizontal support structure on which the nuts are supported with their axes vertical,
   means for continuously advancing a series of nuts along said support structure,
   a slurry deposit station at which the interior of the nuts are filled with a slurry of thermoplastic resin particles in a liquid carrier to a predetermined height from the bottom ends thereof,
   the support structure at said deposit station arranged to leave the bottoms of the threaded openings in the nuts unobstructed, to provide for drainage from the nut openings except for slurry retained in shaped form in the bottoms of the thread grooves, and
   a thread clearing station at which the thread grooves at the lower ends of the nuts are cleared of slurry as they continue to advance as received from said deposit station.

2. Apparatus as defined in claim 1, in which the means for advancing the nuts through said deposit station comprises compressible flexible drive belts engaging opposite sides of said nuts, and means for driving the belts in synchronism.

3. Apparatus as defined in claim 2, which comprises grooved supports at the sides of the channel in which the drive belts are received.

4. Apparatus as defined in claim 3, in which said drive belts are tubes.

5. Apparatus as defined in claim 1, in which the means for depositing the slurry in the nuts as they advance through said deposit station comprises an upwardly directed supply tube below said nut support structure at said deposit station to direct the slurry into the bottom open ends of the nuts.

6. Apparatus as defined in claim 5, comprising a container below the nut support structure at said deposit station to receive slurry drained from the nuts, and pump means to pump slurry from said container to said supply tube pumping slurry from said container through said supply tube.

7. Apparatus as defined in claim 5, in which the means for depositing the slurry into the threaded openings of the nuts has a capacity to completely fill the threaded openings of the nuts.

8. Apparatus as defined in claim 1, in which the means for depositing the slurry in the threaded nut openings is of a capacity to supply an excess of material which appears on the ends and sides of the nuts, and a washing station disposed between said deposit station and said thread clearing station comprising means for washing excess slurry from the exterior of the nuts.

9. Apparatus as defined in claim 8, in which the washing means comprises nozzle means for projecting a stream of washing liquid against one side of the nuts.

10. Apparatus as defined in claim 8, in which the washing means comprises nozzle means for projecting the stream of washing liquid against both sides of the nuts.

11. Apparatus as defined in claim 8, in which the washing means comprises means engaging the upper sides of said nuts to prevent entry of washing liquid into the threaded interiors of the nuts.

12. Apparatus as defined in claim 11, in which the means engaging the upper sides of nuts comprises a belt travelling with the nuts as they advance through said washing station.

13. Apparatus as defined in claim 1, in which the clearing station comprises soft porous sponge material engaged with the lower ends of the nuts as they continue to advance, means for substantially saturating the sponge material with liquid, and means for pressing the nuts as they advance into the sponge material to cause the sponge material to protrude upwardly into the thread opening in the nuts.

14. Apparatus as defined in claim 13, in which the sponge material is provided at the upper side of the upper run of a continuous belt, and means for advancing the belt synchronously with the advance of the nuts through said clearing station.

15. Apparatus as defined in claim 13, comprising a vibrator connected to provide rapid vibration of said sponge material.

16. Apparatus as defined in claim 15, in which said vibrator has a frequency of 40-100 cps.

17. Apparatus as defined in claim 16, in which said vibrator has an adjustable vibration amplitude of 0.001-0.005 inches.

18. Apparatus as defined in claim 15, in which the means for pressing the nuts into the sponge material comprises elongated means disposed above the horizontal upper run of said belt a distance less than the vertical thickness of the nuts, said means being engageable with the upper surfaces of nuts on said sponge material.

19. Apparatus as defined in claim 18, comprising means for vertically adjusting said elongated means to control the width of the zone in the nuts from which slurry is removed.

20. Apparatus as defined in claim 18, said elongated means being in the form of a stationary member having a smooth bottom surface against which the upper ends of the nuts are slidable.

21. Apparatus as defined in claim 1, inversion means disposed to invert nuts as they advance from said clearing means, and second clearing means substantially identical with said first recited clearing means to clear slurry from the thread grooves at the other ends of the nuts as they advance.

22. Apparatus for clearing a deposit of a fluid slurry of a liquid and thermoplastic resin particles from thread grooves at one end of a threaded nut, which comprises
a horizontal support, the upper surface of which is formed of a porous, resilient sponge material,
means for supplying a washing liquid to keep the sponge material substantially saturated,
and means for vibrating the support to cause the sponge and the washing liquid to clear slurry from the thread grooves at the lower end of a threaded nut positioned on said support with the threaded opening therein extending vertically.

23. Apparatus as defined in claim 22, in which said horizontal support constitutes the upper run of an endless belt, a reservoir for cleaning liquid beneath said support, means for advancing the belt, and guide means for guiding the lower return run of the belt through said reservoir to wash resin particles from the belt and to saturate the belt as it advances to the horizontal support portion thereof.

24. Apparatus as defined in claim 23, comprising an elongated horizontal member having a smooth lower surfaced spaced above the normal surface of the sponge material a distance less than the vertical dimension of the nuts, said member being effective to press the nuts into said sponge material to cause portions of the sponge material to protrude into the lower ends of the threaded openings in the nuts.

25. Apparatus as defined in claim 24, which comprises means for adjusting the height of said member relative to said sponge material to vary the amount of protuberance of the sponge material into the threaded openings.

26. Apparatus as defined in claim 23, in which the means for vibrating said support comprises a vibrator having a frequency of about 60 cycles/second.

27. Apparatus as defined in claim 26, in which the means for vibrating said support comprises a vibrator having means for adjusting the amplitude of vibration.

28. Apparatus as defined in claim 23, in which the means for vibrating said support comprises a vibrator having means for adjusting the amplitude of vibration.

* * * * *